(12) United States Patent
Lelescu et al.

(10) Patent No.: US 8,050,331 B2
(45) Date of Patent: Nov. 1, 2011

(54) METHOD AND APPARATUS FOR NOISE FILTERING IN VIDEO CODING

(75) Inventors: Dan Lelescu, Morgan Hill, CA (US); Frank Bossen, Plan-les Ouates (CH)

(73) Assignee: NTT DoCoMo, Inc., Tokyo (JP)

( * ) Notice: Subject to any disclaimer, the term of this patent is extended or adjusted under 35 U.S.C. 154(b) by 1560 days.

(21) Appl. No.: 11/437,515

(22) Filed: May 18, 2006

(65) Prior Publication Data

US 2006/0262854 A1 Nov. 23, 2006

Related U.S. Application Data

(60) Provisional application No. 60/683,240, filed on May 20, 2005.

(51) Int. Cl.
*H04N 7/12* (2006.01)
*H04N 11/02* (2006.01)
(52) U.S. Cl. ............... 375/240.29; 375/240.18
(58) Field of Classification Search . 375/240.01–240.29
See application file for complete search history.

(56) References Cited

U.S. PATENT DOCUMENTS

| | | | | |
|---|---|---|---|---|
| 5,625,715 | A * | 4/1997 | Trew et al. | 382/236 |
| 5,706,054 | A * | 1/1998 | Hannah | 375/240.12 |
| 6,023,295 | A * | 2/2000 | Pau | 375/240.04 |
| 2005/0078872 | A1 * | 4/2005 | Samadani et al. | 382/233 |

OTHER PUBLICATIONS

PCT International Preliminary Report on Patentability, PCT US 2006/019641, mailed Dec. 6, 2007 (1 page).
PCT Written Opinion of the International Searching Authority, PCT US 2006/019641, mailed Dec. 6, 2007 (7 pages).
Gopinath R.A., "Wavelet-Based Post-Processing of Low Bit Rate Transform Coded Images," Proceedings of the International Conference on Image Proceedings of the International Conference on Imagine Processing (ICIP) Austin No. 13-16, 1994, Los Alamitos, IEEE Comp. Soc. Press, US, vol. vol.2 Conf. 1, Nov. 13, 1994, pp. 913-917, XP000522748 ISBN: 0-8186-6952-7.
XIn Li et al., "Spatially adaptive imagine denoising under overcomplete expansion," Image Processing, 2000. Proceedings. 2000, Piscataway, NJ, USA, IEEE, vol. 3, 10 Sep. 20-13, 2000, Piscataway, NJ, USA, IEEE vol. 3, Sep. 10, 2000, pp. 300-303, XP010529463 ISBN: 0-7803-6297-7.
Guleryuz O. G., "A Nonlinear Loop Filter for Quantization Noise Removal in Hybrid Video Compression" Image Processing, 2005. ICIP 2005. IEEE International Conference on vol. 2, Sep. 11, 2005, XP002398390.
Lelescu D et al., "Bounded-uncertainty estimation for correlated signal and noise," Signals, Systems, and Computers 2005. Conference Record of the Thirty-Ninth Asilomar Conference on Pacific Grove, California Oct. 28-Nov. 1, Piscataway, NJ, USA, IEEE, Oct. 28, 2005, pp. 1676-1679, XP010900304 ISBN: 1-4244-0131-3.

(Continued)

*Primary Examiner* — David Czekaj
(74) *Attorney, Agent, or Firm* — Blakely, Sokoloff, Taylor & Zafman LLP

(57) ABSTRACT

A method and apparatus is disclosed herein for encoding and/or decoding video frame data. In one embodiment, the video coder comprises a noise filtering module to operate on transformed frame data and perform signal estimation on a plurality of transform coefficients by estimating signal power for each of the plurality of transform coefficients, comparing the signal power of said each coefficient with at least one threshold, and setting the value of said each transform coefficient based, at least in part, on results of comparing the signal power to the at least one threshold.

23 Claims, 11 Drawing Sheets

OTHER PUBLICATIONS

Reeve, H.C. et al.: "Reduction of blocking effects in image coding," Opt. Eng., vol. 23, No. 1, pp. 34-37. Jan./Feb. 1984.

Wiegand, G.J. et al.: "Overview of the H.264/AVC Video Coding Standard," IEEE Transactions on Circuits and Systems for Video Technology, on pp. 560-576, vol. 13, Issue: 7, Jul. 2003.

Papoulis, A.: "Probability, Random Variables, and Stochastic Processes," 3rd edition, New York, McGraw-Hill, 1991, Chapters 11-14.

Coifman, R.R. et al.: "Translation-Invariant De-Noising," in Wavelets and Statistics, Springer Lecture Notes in Statistics 103, pp. 125-150, New York, Springer Verlag.

Eldar, Y.C. et al.: "Linear Minimax Regret Estimation of Deterministic Parameters with Bounded Data Uncertainties," IEEE Transactions on Signal Processing, vol. 52, No. 8, Aug. 2004.

PCT International Search Report for PCT Appln No. US 2006/019641, mailed Oct. 17, 2006 (6 pages).

PCT Written Opinion for PCT Appln No. US 2006/019641, mailed Oct. 17, 2006 (7 pages).

Gopinath, R. A.: "Wavelet-Based Post-Processing of Low Bit Rate Transform Coded Images" Proceedings of the International Conference on Image Processing (ICIP), Austin, Nov. 13-16, 1994, Los Alamitos, IEEE Comp. Soc. Press, US, vol. vol. 2 Conf. 1, Nov. 13, 1994, pp. 913-917, XP000522748.

Li, X., et al.: "Spatially adaptive image denoising under overcomplete expansion" Image Processing, 2000. Proceedings. 2000 International Conference on Sep. 10-13, 2000, Piscataway, NJ, USA, IEEE, vol. 3, Sep. 10, 2000, pages 300-303, XP010529463.

Guleryuz, O. G. (ED)—Matthews M. B. (ED) Institute of Electrical and Electronics Engineers: "Weighted overcomplete denoising" Conference Record of the 37th. Asilomar Conference on Signals, Systems, & Computers. Pacific Grove, CA, Nov. 9-12, 2003, IEEE, US, vol. 1 of 2, Conf. 37, pp. 1992-1996, XP010701672.

Xiong, Z. et al.: "A Simple Deblocking Algorithm for JPEG Compressed Images Using Overcomplete Wavelet Representations" ISCAS '97. Proceedings of the 1997 IEEE International Symposium on Circuits and Systems. Circuits and Systems in the Information Age. Hong Kong, Jun. 9-12, 1997, vol. 2, pp. 1077-1080, XP000832387.

Johnstone, I. M., et al.: "Wavelet Threshold Estimators for Data with Correlated Noise" Journal of the Royal Statistical Society. Series B. Methodological, Royal Statistical Society, London, GB, vol. 59, No. 2, 1997, pp. 319-351, XP008033501.

Coifman, R. R., et al.: "Translation invariant denoising" Technical Report 475, Dept. of Statistics, Stanford University, May 1995, XP002328831.

Guleryuz, O. G.: "A Nonliner Loop Filter for Quantization Noise Removal in Hybrid Video Compression" Image Processing, 2005. ICIP 2005. IEEE International Conference on, vol. 2, Sep. 11, 2005, XP002398390.

Lelescu, D. et al.: "Bounded-uncertainty estimation for correlated signal and noise" Signals, Systems and Computers, 2005. Conference Record of the Thirty-Ninth Asilomar Conference on Pacific Grove, CA Oct. 28-Nov. 1, Piscataway, NJ, USA, IEEE, Oct. 28, 2005, pp. 1676-1679, XP010900304.

Choy, S. O., et al.: Reduction of Block-Transform Image Coding Artifcats by Using Local Statistics of Transform Coefficients IEEE Signal Processing Letters, IEEE Service Center, Piscataway, NJ, US, vol. 4, No. 1, Jan. 1997, XP011059900.

Ling, et al.: "A novel method for blocking effect reduction in DCT-coded images" ISCAS'99. Proceedings of the 1999 IEEE International Symposium on Circuits and Systems. Orlando, FL, May 30-Jun. 2, 1999, IEEE International Symposium on Circuits and Systems, New York, NY: IEEE, US, vol. 4 of 6, 1999, pp. 46-49, XP002161834.

Motwani, M. C., et al.: "Survey of Image Denoising Techniques" Proceedings of GSPX 2004, Santa Clara, CA, Sep. 27, 2004, XP002398391.

Wiegand, T. et al.: "Overview of the H.264/AVC Video Coding Standard" IEEE Transactions on Circuits and Systems for Video Technology, IEEE Service Center, Piscataway, NJ, US, vol. 13, No. 7, Jul. 2003, pp. 560-576, XP001169882.

* cited by examiner

METHOD AND APPARATUS FOR NOISE FILTERING IN VIDEO CODING

PRIORITY

The present patent application claims priority to and incorporates by reference the corresponding provisional patent application Ser. No. 60/683,240, titled, "Method And Apparatus For Noise Filtering in Video Coding," filed on May 20, 2005.

FIELD OF THE INVENTION

The present invention relates to the field of video coding; more particularly, the present invention relates to performing noise filtering in video coding based on estimation of the signal power of coefficients and a comparison of those estimates to one or more thresholds.

BACKGROUND OF THE INVENTION

Conventional methods of hybrid video coding either encode a video frame by itself, without reference to other frames in the sequence, or encode a video frame by predicting it from other, already coded and reconstructed, frames in the sequence. This process routinely operates at block-level in the images. In either case, the frames that are reconstructed following the coding process contain distortions introduced by this process, which can be modeled as noise. This noise may manifest itself visibly as coding artifacts, such as blocking and ringing artifacts. Some of the reconstructed frames stored in a frame store typically used by a video coder and decoder are further used as reference for predicting other frames in the sequence while others are not. In the previous case, the quality of the reconstructed frame stored in the frame store is not only important for its display but, through its use in the prediction process, influences the quality of subsequently coded frames which rely on it for reference purposes. In the latter case, for frames that are not further used as reference, their quality is important for display purposes. Thus, in either case, a procedure to remove the coding noise is beneficial for the quality of the reconstructed video sequence and an increase in the objective coding efficiency.

Most modern codecs include some type of filtering to reduce the level of resultant coding noise. The filtering can operate outside or inside of the coding loop in a codec. For loop filters which operate inside the coding loop, generally the same operation is performed in the encoder and in the decoder using the same available data, such that no side information specific to this filtering needs to be transmitted explicitly from the coder to the decoder. Noise filtering methods commonly used include simple low-pass filtering of the reconstructed frame data to smooth out the images and decrease the visibility of coding artifacts, and loop filters that adapt their strength based on local image characteristics (such as block edges).

Out-of-coding-loop filtering techniques, such as a lowpass filtering of a reconstructed (noisy) frame at the decoder are usually not sufficient for improving the overall image quality of the decoded video sequence. See, H. C. Reeve and J. S. Lim, "Reduction of Blocking Effects in Image Coding," Opt. Eng., Vol. 23, no. 1, pp. 34-37. January/February 1984. In-loop filters that perform filtering inside the coding and decoding loop in an encoder and decoder, respectively, have superior performance. For more information, see Wiegand, et al., "Overview of the H.264/AVC Video Coding Standard," IEEE Transactions on Circuits and Systems for Video Technology, on page(s): 560-576, vol. 13, Issue: 7, Jul. 2003. They usually adapt the filtering strength in a heuristic manner, based on the quantization regime used by the video codec and the characteristics of the signal being filtered. Also, since they operate in the coding loop, they cause an improvement in the quality of the reference frames used for prediction, thus improving the efficiency of the coding process.

In contrast to operating heuristically, there exist filtering techniques that are based on signal estimation from noise using a particular signal model. For more information, see A. Papoulis, "Probability, Random Variables, and Stochastic Processes", $3^{rd}$ edition, New York, McGraw-Hill, 1991.

Overcomplete denoising techniques that operate in the transform domain provide additionally the advantage of determining multiple reconstructed instances (estimates) for the same sample position in a frame, which can then be combined (e.g., averaged) in order to improve the estimation quality. See, R. R. Coifman and D. L. Donoho, "Translation Invariant Denoising," in Wavelets and Statistics, Springer Lecture Notes in Statistics 103, pp. 125-150, New York, Springer Verlag. Existing denoising approaches, which attempt to extract the signal from coding noise, have at their core a signal estimator. Since usually the statistics of the problem are not known exactly, it is necessary to make some assumptions about the unknowns and choose a strategy for estimating the signal. One of the most popular strategies is to optimize the signal estimation for the worst-possible choice of unknowns, resulting in robust estimators. For more information, see Y. C. Eldar, A. B.-Tal, and A. Nemirovski, "Linear Minimax Regret Estimation of Deterministic Parameters with Bounded Data Uncertainties," IEEE Transactions on Signal Processing, Vol. 52, No. 8, August 2004. It is well-known that under this design constraint, the estimators that result tend to be too conservative because the performance is optimized for the worst-case scenario.

The performance of prior methods of coding noise filtering is limited by some intrinsic characteristics of these methods and the assumptions made about the nature of the noise. Simple low-pass filtering techniques that are applied to reduce coding artifacts are not effective in handling the diversity of visual information in video frames, and tend to have widely-varying performance for these sequences (lack of performance control). Adaptive, in-loop boundary filtering in video coding uses heuristics that do not guarantee optimal solutions in some well-defined sense. Also, existing denoising techniques based on the use of a signal model, determine estimators under unrealistic assumptions about the nature of the signal and noise, in particular by assuming that the signal and noise are uncorrelated. This is not the case for the signal and coding noise encountered in image and video coding. The performance of these filtering techniques suffers, since they are poorly matched to the existing problem conditions.

SUMMARY OF THE INVENTION

A method and apparatus is disclosed herein for encoding and/or decoding video frame data. In one embodiment, the video coder comprises a noise filtering module to operate on transformed frame data and perform signal estimation on a plurality of transform coefficients by estimating signal power for each of the plurality of transform coefficients, comparing the signal power of said each coefficient with at least one threshold, and setting the value of said each transform coefficient based, at least in part, on results of comparing the signal power to the at least one threshold.

BRIEF DESCRIPTION OF THE DRAWINGS

The present invention will be understood more fully from the detailed description given below and from the accompa

DETAILED DESCRIPTION OF THE PRESENT INVENTION

Figure 1:
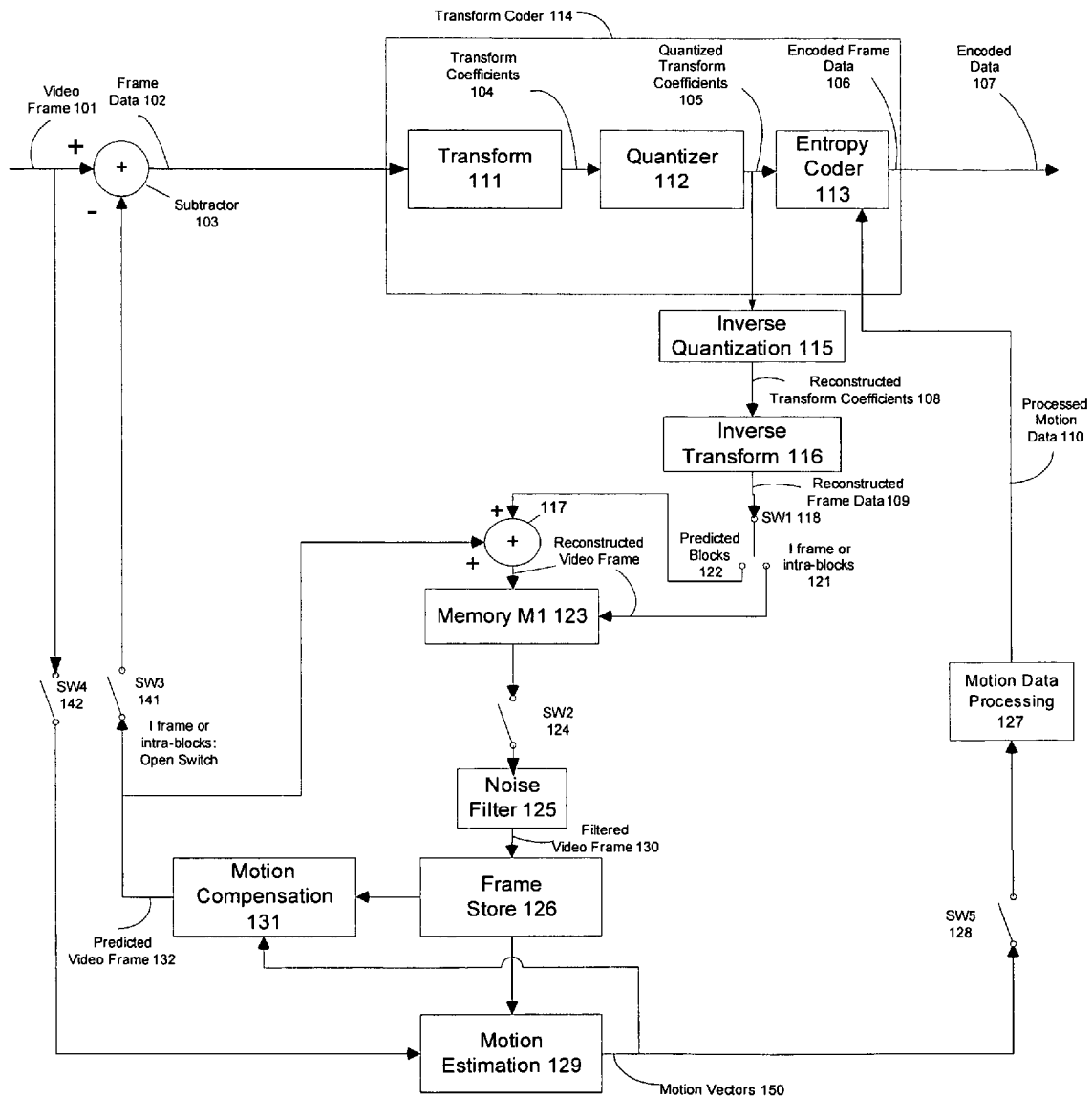
- FIG. 1 is a block diagram of one embodiment of a video coder.

Apparatus and methods for implementing a signal denoising technique for video coding and decoding are disclosed. In one embodiment, a filtering apparatus operates on the reconstructed frame data generated by a video codec, and the filtering process takes place in an overcomplete transform domain corresponding to the frame data. An estimation of the signal from the noise incurred by the coding process is performed in this transform domain. In one embodiment, this estimation process comprises estimating the signal power corresponding to a transform coefficient, comparing the estimated signal power to one or more thresholds, and adjusting the transform coefficient based on the results of the comparison. Thus, the estimation process uses the estimated signal power, noise power, and the values of the threshold(s).

In one embodiment, given the overcomplete representation, for each data sample position in a frame being processed there correspond multiple estimates of the sample at that position, as they are produced by the estimation process. These initial estimates of each data sample are further filtered in order to obtain the final estimate for a data sample at a given position in the processed video frame. Such filtering may comprise averaging.

Thus, adaptive estimation in the overcomplete transform domain is used to extract the signal from noise incurred during the coding process. In one embodiment, the estimator in the noise filter to estimate the signal power operates based on assumptions about the signals and noise in the coding process. Also, in one embodiment, the signal estimators are designed to achieve a balance between robustness and performance such as to avoid the drawbacks of related art estimators described.

The use of this signal denoising technique results in improved objective rate-distortion performance, as well as better subjective (visual) quality of the decoded video frames compared to related art techniques for video frame filtering.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of Video Coder Embodiments

In one embodiment, a video codec contains a filtering module that processes frame data in order to reduce or eliminate the coding noise, and thus improves both the objective and subjective quality of the coding process. The noise filter employs adaptive estimation techniques operating in a domain constructed by a representation of the frame data in an overcomplete basis to extract the video signal from the noisy frame data. The apparatus and methods described herein perform estimation and filtering operations in the overcomplete basis representation of the frame data in a different manner than in existing related art, and their use results in superior performance when compared to the related art. Some differences from related art include, but are not limited to, the structure of the estimator used for extracting the signal from noise, the estimation of other variables that are used by this estimator, and by the structure of the filter that is used to process the signal estimates produced by the estimator in order to determine the final filtered data samples that are used either for display, or for both reference and display purposes as described above.

The use of the estimation techniques and/or the filtering processes described herein invention results in an increased data coding efficiency reflected in a better rate-distortion profile of the coding process, as well as in the improved visual quality of the decoded video sequence through the reduction or elimination of coding artifacts, compared to related art methods.

FIG. 1 is a block diagram of one embodiment of a video coder. Referring to FIG. 1, the video coder comprises a motion estimation module (MEM) 129, a motion-compensated prediction module (MCPM) 131, a memory 123, a transform coding module (TCM) 114, a motion data processing module (MDPM) 127, a noise filter module (NFM) 125, a frame store (FS) (e.g., memory) 126, and switches 118, 124, 128, 141, and 142. Transform coder 114 in turn includes a transform module 111, a quantizer module 112, and an entropy coding module 113. The frame data at the input of the transform coder 114 may consist of video frames, or displaced frame difference (DFD) frames. A DFD frame is obtained in the video coder by taking the difference between data in a video frame and its prediction generated at the output of MCPM 131. The difference is output from subtractor 103 that receives video frame 101 and an I frame or intra-block (when switch 141 is closed). MCPM 131 generates a prediction based on data consisting of motion-compensated reconstructed video frames stored in frame store 126. The motion compensation takes place using motion information generated by the motion estimation module 129. This process is enabled by a configuration of the switches in FIG. 1 that will be discussed below. Alternatively, when a video coder (VC) directly encodes a video frame corresponding to the intra-coding mode of conventional coders, without the use of prediction, MEM 129, MCPM 131, and MDPM 127 are not utilized.

The video coder typically operates sequentially on block-partitioned frame data, which consists of luminance and chrominance values at each position in a block.

Figure 2:
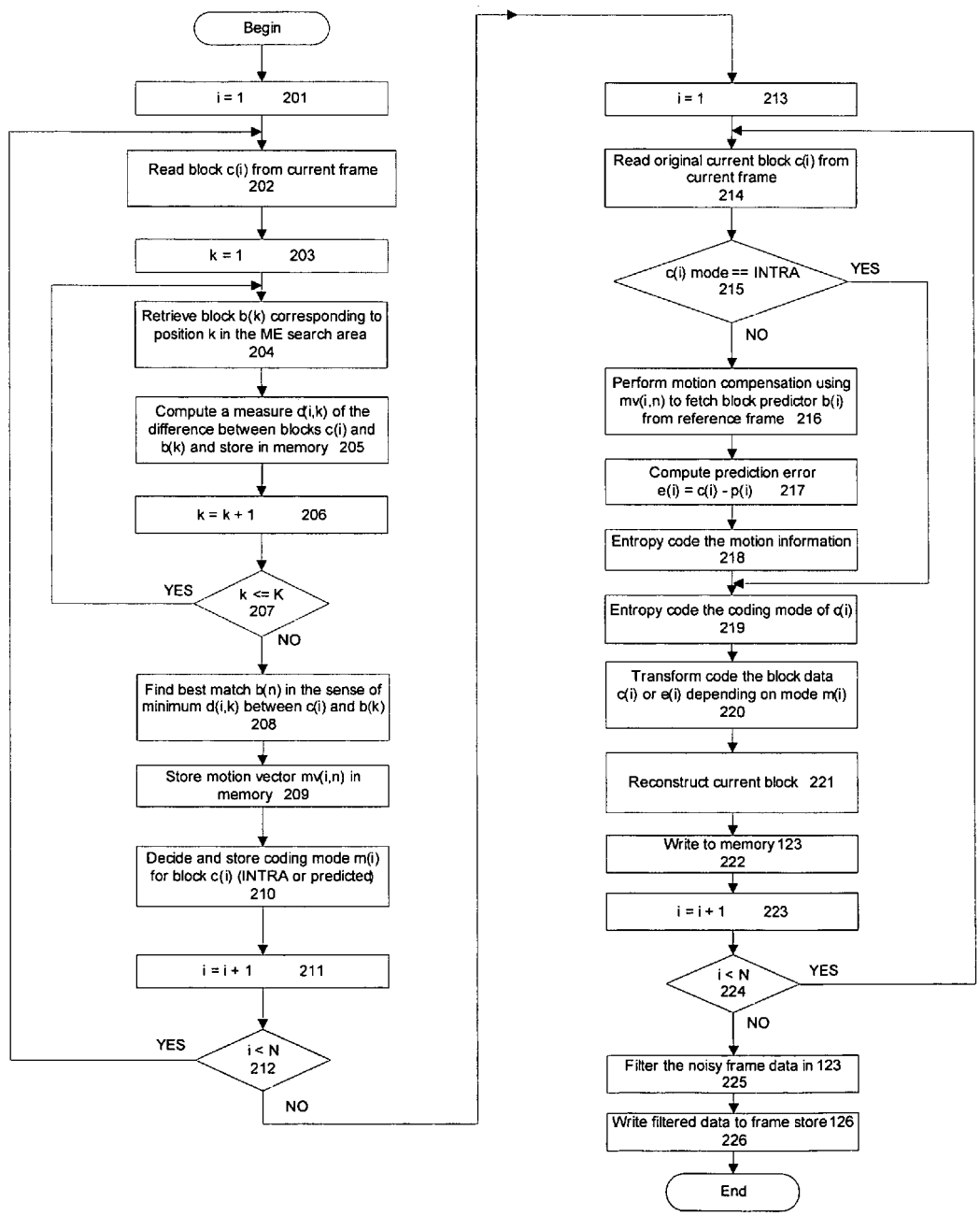
FIG. 2 is a flow diagram of one embodiment of a video coding process.

FIG. 2 is a flow diagram of one embodiment of a video coding process. The process is performed by processing logic that may comprise hardware (circuitry, dedicated logic, etc.), software (such as is run on a general purpose computer system or a dedicated machine), or a combination of both.

In FIG. 2, blocks from a frame are read and processed sequentially as described by the following process, until all blocks of the current frame have been processed. Referring to FIG. 2, the process begins by processing logic setting an index variable i, used to index the blocks in the current frame, equal to 1 (processing block 201). Next, processing logic reads block c(i) from the current frame (processing block 202).

In a first phase of the video coder operation, switches in FIG. 1 are configured as follows. Switches 141, 142, and 128 are open or closed depending on the type of blocks being processed (open for intra-coded blocks, and closed for predicted blocks as in a conventional video process). Switch 124 is open.

Processing logic also initializes index k equal to 1, where the index k is a position from the search area corresponding to the current block c(i) (processing block 203) and retrieves a reference block b(k) in the reference frame corresponding to the position k in the motion estimation search area (processing block 204). A motion estimation process is performed, whereby candidate positions within a search area in a reference frame from the frame store are sequentially searched to identify a best-match reference block for the current block c(i). A goodness of match measure is used to quantify the differences between block c(i) and b(k). The motion estimation process attempts to find a block b(k) in a search area in reference frame so as to minimize a measure of difference d(i,k) between the current block c(i) and the reference block b(k). This position is specified by a motion vector mv(i,k) originating at the current block c(i) and pointing to the reference block b(k) in the reference frame.

Processing logic computes a measure d(i,k) of the difference between blocks c(i) and b(k) and stores that in memory (processing block 205). In one embodiment, the difference d(i,k) is quantified for example by a sum of absolute differences between the samples of c(i) and b(k). Thus, for current block c(i), a position k inside the search area is tested by retrieving the corresponding reference block b(k) and computing d(i,k) and the error d(i,k) is stored in memory.

Processing logic then increments the variable k by 1 (processing block 206) and tests whether the variable k is less than or equal to K, which is the total number of positions in the search area (processing block 207). If all the search area positions from the reference frame corresponding to the current block c(i) have not been examined (i.e., k<K), processing logic transitions back to processing block 204 and the process continues from there. If they have (i.e., k is not less than K), processing logic transitions to processing block 208 where processing logic finds the best match b(n) in the sense of the minimum d(i,k) between c(i) and b(k). In one embodiment, after all K search area positions from a reference frame corresponding to the current block c(i) have been visited, processing logic of MEM 129 finds the smallest error $d_{min}$ among the array of values d(i,k) stored in memory, which corresponds to a specific reference block denoted by $b_{min}$ whose coordinates are specified by motion vector mv(i).

Thereafter, processing logic stores the motion vector mv(i,n) in memory (processing block 209) and decides, and stores, the coding mode m(i) for block c(i), where the coding mode m(i) for block c(i) is INTRA or predicted (processing block 210). In one embodiment, processing logic of MEM 129 determines the coding mode cmode(i) of the current block c(i) by comparing a cost of encoding the current block c(i) when intra coding its samples with a cost of encoding block c(i) predictively with respect to the block $b_{min}$. If the first cost is smaller, the mode of the block c(i) is marked as INTRA; otherwise the block is marked as a predicted block.

If the coding mode for block c(i) is not INTRA, then the motion vector mv(i) is stored in memory. The mode cmode(i)

of the current block is also written in memory, and the process moves on to the next block c(i) in the current frame by having processing logic increments the index variable i by 1 (processing block 211) and testing whether i is less than N, which is total number of blocks in the current frame (processing block 212). If the index i is less than N, processing logic transitions to processing block 202 and the process continues from there. If not, processing logic transitions to processing block 213 where the index variable i is set equal to 1.

Once all the blocks in the current frame have been processed as described above, the motion compensation process is initiated. The motion compensation process begins by processing logic reading the original current block c(i) from the current frame (processing block 214). In one embodiment, the blocks are read sequentially. Processing logic tests whether the coding mode for block c(i) is equal to INTRA (processing block 215). In one embodiment, this is performed by processing logic in MCPM 131. If the coding mode for block c(i) is equal to INTRA, processing logic transitions to processing block 219. If not, processing logic performs motion compensation using mv(i,n) to fetch the block predictor b(i) from the reference frame (processing block 216), computes the prediction error e(i) according to the formula:

$$e(i) = c(i) - p_r(i)$$

where the prediction block p(i) is produced by MCPM 131 using motion vector mv(i) stored in memory for block c(i) (processing block 217), entropy codes the motion information (processing block 218), and transitions to processing block 219. In one embodiment, the motion vector data corresponding to the current block is sent to MDPM 127 where it is processed (e.g., DPCM encoded with respect to neighboring blocks' motion vectors), and sent to the entropy coder module 113 for encoding.

At processing block 219, processing logic entropy codes the coding mode of c(i). Processing logic then transforms code the block data c(i) or e(i) depending on the mode m(i) (processing block 220), reconstructs the current block (processing block 221), and writes that to memory (e.g., memory 123) (processing block 222).

The process described above is repeated for all the blocks in the current frame. To that end, processing logic then increments the index i by one (processing block 223) and tests whether the index i is less than N, which is the total number of blocks in the current frame (processing block 224). If it is, processing transitions to processing block 214 and the process continues from there. If not, processing logic filters the noisy frame data in memory (e.g., memory 123) (processing block 225) and writes the filtered data to the frame store (e.g., frame store 126) (processing block 226). Thereafter, the process ends.

After all the blocks in the current frame have been processed, switch 124 is then closed. The reconstructed frame data stored in memory 123 is processed by noise filter module 125 as described below. Noise filter module 125 stores the data it processes in frame store 126.

Noise Filtering

Figure 3:
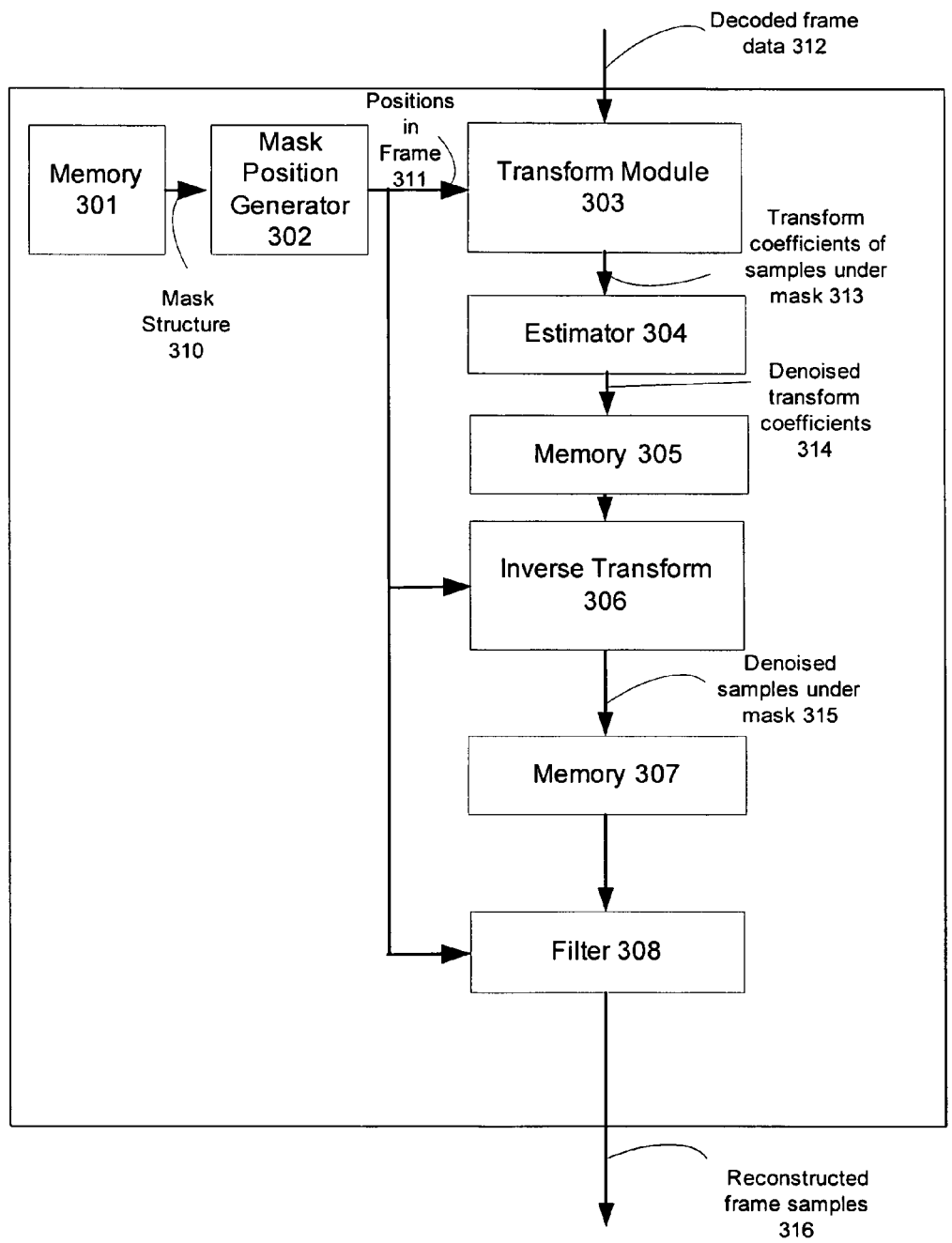
FIG. 3 is a block diagram of one embodiment of a noise filter module.

FIG. 3 is a block diagram of one embodiment of a noise filtering module (e.g., noise filtering module 125 of FIG. 1). Referring to FIG. 3, the noise filtering module comprises a memory 301, a spatial mask position generation module (MPGM)) 302, a transform module (TM) 303, an estimator module (EM) 304, a memory 305, an inverse transform module (ITM) 306, a memory 307, and a filter module (FM) 308. Memory 301 provides a mask structure 310 to mask position generator 302. In response thereto, mask position generator 302 sets forth positions in the frame 311 and provides these positions to transform module 303, inverse transform 306 and filter 308. Transform module 303 applies a transform to decoded frame data 312 to generate transform coefficients 313 of samples under the mask set forth by mask position generator 302. Estimator 305 receives transform coefficients 313 and generates denoised transform coefficients 314 in response thereto. Denoised transformed coefficients 314 are stored in memory 305. Subsequently, inverse transform module 306 applies an inverse transform to denoised transform coefficients, based on the mask from mask position generator 302, to generate denoised samples 315 under the mask. These are stored in memory 307. Filter module 308 performs filtering on denoised samples 315, based on the mask from mask position generator 302, to produce reconstructed frame samples 316.

The input to the noise filter module consists of the reconstructed frame data 312 (e.g., decoded frame data) stored in the memory module 123. The noise filter module outputs the filtered frame data 316 (e.g., reconstructed frame samples) to frame store 126. The operation of the noise filter module proceeds as illustrated by the flow diagrams depicted in FIGS. 4, 5, and 6.

Figure 4:
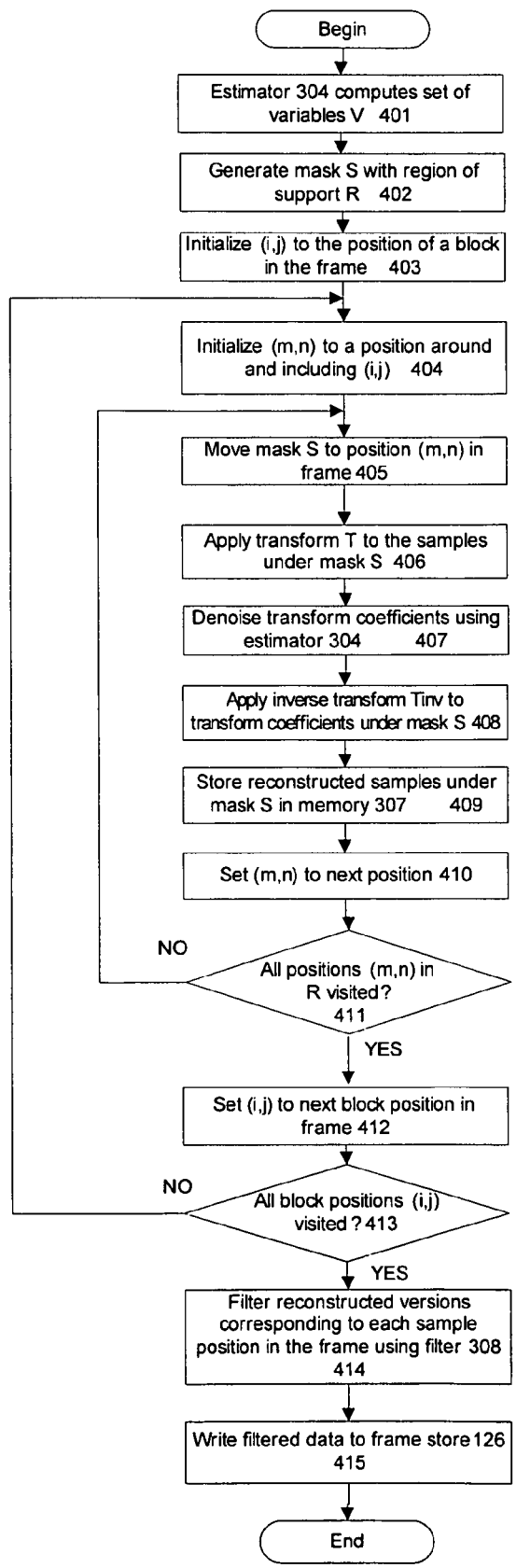
FIG. 4 is a flow diagram of one embodiment of a noise filtering process.

FIG. 4 is a flow diagram of embodiment of a noise filtering process. The process is performed by processing logic that may comprise hardware (circuitry, dedicated logic, etc.), software (such as is run on a general purpose computer system or a dedicated machine), or a combination of both. In one embodiment, the processing logic is part of estimator 304 of the noise filter module of FIG. 3.

The process performed by the noise filter module begins by retrieving from memory (e.g., 123) the reconstructed frame data stored therein. Using the reconstructed frame data, processing logic computes a set of variables V (processing block 401). This set of auxiliary variables V will be further used in the estimation process. Based on the quantization regime used by the codec, the estimator computes a measure of the quantization noise introduced by the coding process. For purposes herein, the quantization step used in the encoding process is denoted by q. In one embodiment, processing logic computes the auxiliary variable $$v^2 = \alpha \frac{q^2}{4},$$

where α is a constant, and $v^2$ represents an estimate of the noise power. Processing logic in the estimator also determines the value of a variable b, based on the characteristics of coding regime used in the encoder. In this case, b is computed as $b = \beta v^2$, where β is a constant. In another embodiment, processing logic computes additional auxiliary variables as follows:

$$t_1 = \mu v^2 - (\mu - 1)b$$
$$x_1 = \sqrt{b}$$
$$x_2 = \sqrt{t_1}$$
$$z_1 = \frac{1}{x_2 - x_1}$$
$$z_2 = x_1 z_1,$$

where μ is a selectable constant.

In yet another embodiment, processing logic computes the following auxiliary variables:

$$t_1 = \mu v^2 - (\mu - 1)b$$
$$x_1 = \sqrt{b}$$
$$x_2 = \sqrt{t_1}$$
$$y_2 = \frac{\mu}{\mu+1} x_2,$$
$$h_1 = \frac{y_2}{x_2 - x_1},$$
$$h_2 = \frac{y_2 x_1}{x_2 - x_1},$$

where $\mu$ is a selectable constant.

Processing logic then sets mask S with a region of support R (processing block 402). For example the mask size (region of support R) can be made equal to that of a block used in the encoding process.

Thereafter, processing logic initializes (i,j) to the position of a block in the frame (processing block 403). This block position (i,j) is situated on the grid of blocks customarily used by a video codec to code/decode a frame is selected in the frame currently being filtered from memory (e.g., memory 123).

Processing logic also initializes (m,n) to a position around and including (i,j) (processing block 404). The position (m,n) represents the position where the mask S is shifted compared to (i,j). Processing logic then moves the mask S to position (m,n) in the frame (processing block 405).

Processing logic applies the transform T (e.g., a Discrete Cosine transform (DCT)) to samples under mask S (processing block 406) and denoises the transformed coefficients using processing logic in the estimator (processing block 407). The N transform coefficients corresponding to the data samples covered by the current position of the mask S are denoted herein by s(k), k=1 . . . N. The resulting transform coefficients are processed by processing logic in the estimator module. Different embodiments for this operation are illustrated in the flow diagrams of FIGS. 7 and 8, which are described in greater detail below.

Figure 7:
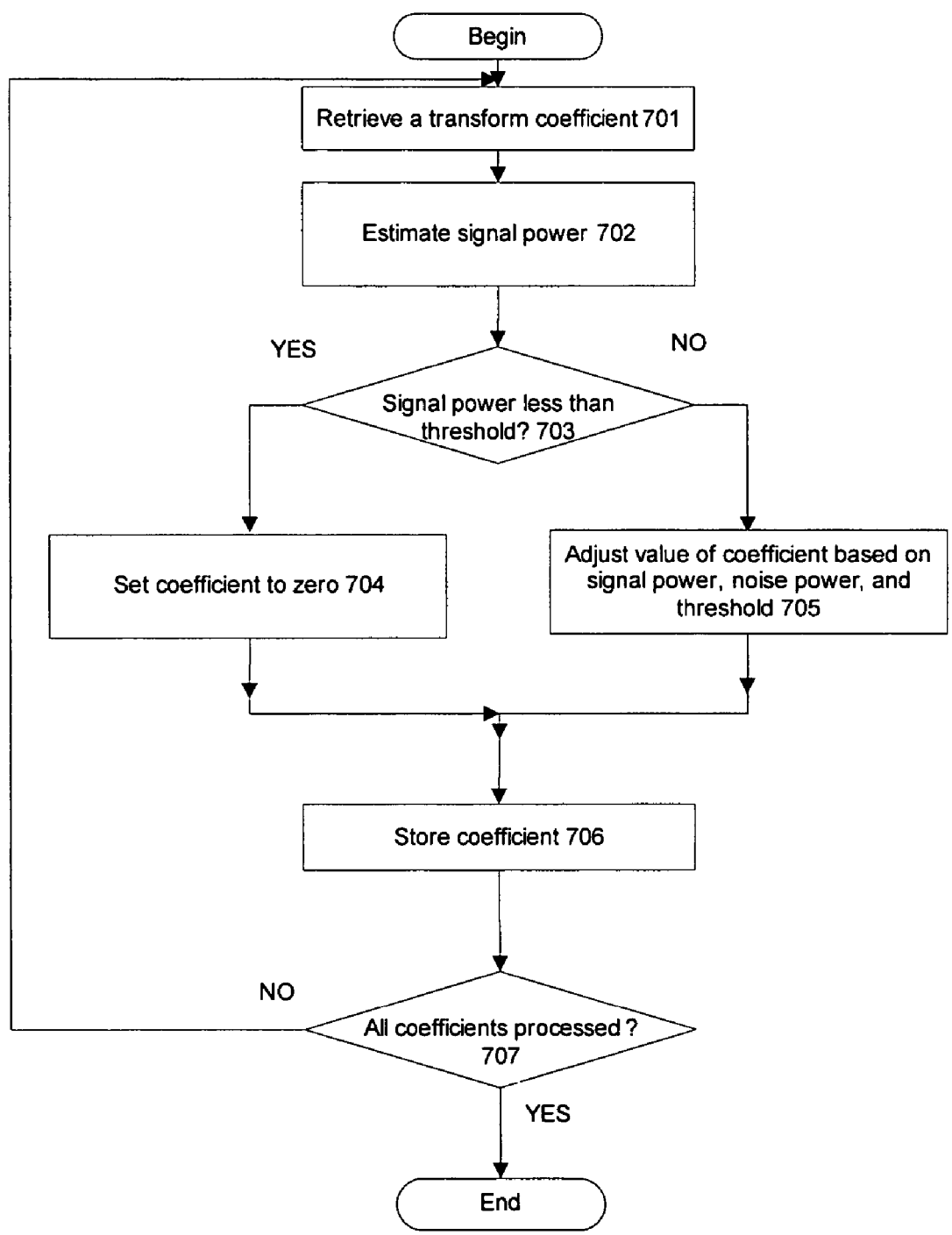
FIG. 7 is a flow diagram of one embodiment of an estimation process.

In the flow diagram of FIG. 7, processing logic in the estimator module retrieves a transform coefficient s(k) and estimates the signal power by computing the value $s^2(k)$. Processing logic then compares the signal power with a threshold and determines the estimator value a(k) corresponding to a coefficient s(k) as follows:

if $s^2(k) <= b$
$a(k) = 0;$
else
$$a(k) = \frac{s^2(k) - b}{s^2(k) + v^2 - 2b}.$$

Processing logic in the estimator then determines the processed transform coefficient p(k) according to:

$p(k)=a(k)s(k).$

In an alternate embodiment, using the process depicted in the flow diagram of FIG. 8, processing logic in the estimator makes use of the auxiliary variables V previously defined above and computes the value of the estimator for each coefficient s(k) as follows:

if $s^2(k) <=b$
 $a(k) = 0;$
else if $b< s^2(k) <='1$
 $a(k) = z_1 s(k) - z_2$
else
 $a(k) = 1.$ Processing logic in the estimator then determines the processed transform coefficient p(k) as:

$p(k)=a(k)s(k).$

In an alternate embodiment, also using the process depicted in the flow diagram of FIG. 8, for each coefficient s(k), processing logic in the estimator computes the value of processed coefficient p(k) as follows:

if $s^2(k) <=b$
 $p(k) = 0;$
else if $b< s^2(k) <='1$
 $p(k) = h_1 s(k) - h_2$ ;
else
 $p(k) = s(k).$ p(k)=s(k). FIG. 8 will be described in more detail below.

Figure 8:
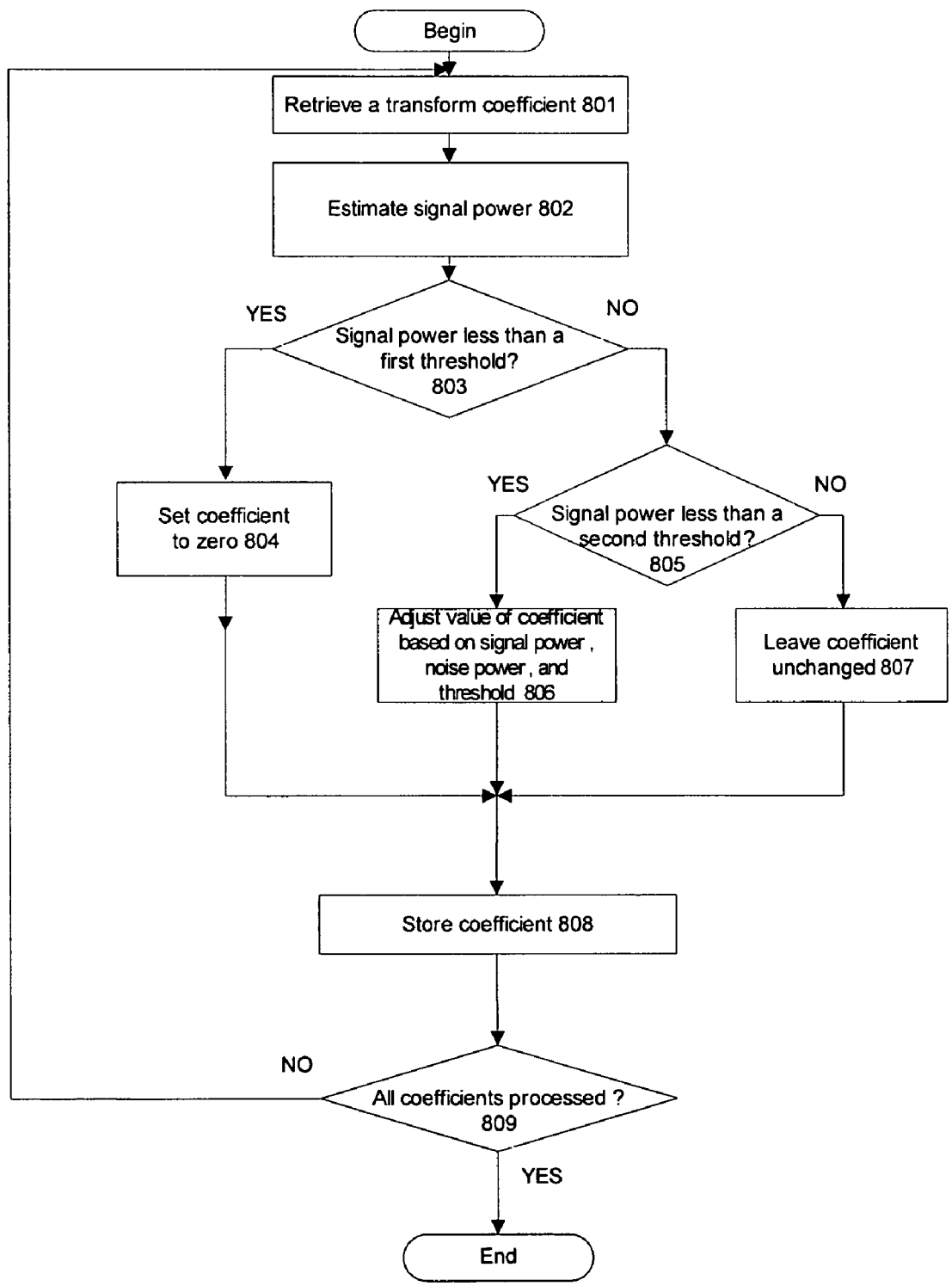
FIG. 8 is a flow diagram of another embodiment an estimation process.

Processing logic stores the coefficient p(k) in memory (e.g., memory 305), irrespective of the whether the process of FIG. 7 or 8 are used. If not all coefficients have been processed the process described above is repeated.

Next, processing logic applies the inverse transform $T^{-1}$ (e.g., an inverse DCT transform) to the processed transform coefficients p(k) under mask S (processing block 408), resulting in samples r(k) corresponding to the current position (m,n) of the mask S in the frame. Processing logic stores these processed samples under mask S in memory (e.g., memory 307) (processing block 409).

Processing logic then sets (m,n) to the next position (processing block 410) and tests whether all positions (m,n) in the region of support R have been visited (processing block 411). If not all the positions of the mask S around block position (i,j) have been processed, processing transitions to processing block 405, the next shift position (m,n) of mask S relative to (i,j) is selected and the process described above is repeated.

If all the positions of the mask S around block position (i,j) have been processed, processing block transitions to processing block 412, where processing logic selects the next block position (i,j) on the block grid in the frame tests whether all block positions (i,j) of the block being processed in the frame have been processed (processing block 413). If not, processing logic transitions to processing block 404 where the process continues from there. If so, processing transitions to processing block 414. In this way, the process above is repeated until all block positions (i,j) have been visited.

At processing block 414, processing logic filters the reconstruction versions corresponding to each sample position in the frame using a filter (e.g., filter 308) (processing block 414) and writes the resulting filtered data samples f(x,y) for the current frame being processed into the frame store (e.g., frame store 126) (processing block 415). In one embodiment, processing logic filters the processed samples stored in memory (e.g., memory 307) corresponding to each sample in the current frame. In one embodiment, this filtering is performed by filter 308 of the noise filter module 125. Thus, for each position (x,y) in the current frame being processed by the noise filter module 125, there are multiple processed and reconstructed samples $r^l(x,y)$ stored in memory 307 by the estimator 304, where l=1 ... L indexes the positions that the mask S can occupy around a block grid position in the frame, and where at each such location the mask S region of support R contains sample position (x,y). In one embodiment, the filter performs a weighted average operation on its input data $r^l(x,y)$ corresponding to a frame position (x,y):

$$f(x, y) = \sum_l w_l r^l(x, y),$$

where $w_l$ are weights selected based on statistics generated by processing logic in the estimator. In one embodiment, the weights are all selected to be equal, $$w_l = \frac{1}{L},$$

and correspond to an averaging operation. In an alternative embodiment, the weights are selected to be proportional to the number of zero-valued processed coefficients p(k,) resulting after the application of the estimator at a position l of the mask S.

Then the process ends.

Figure 5:
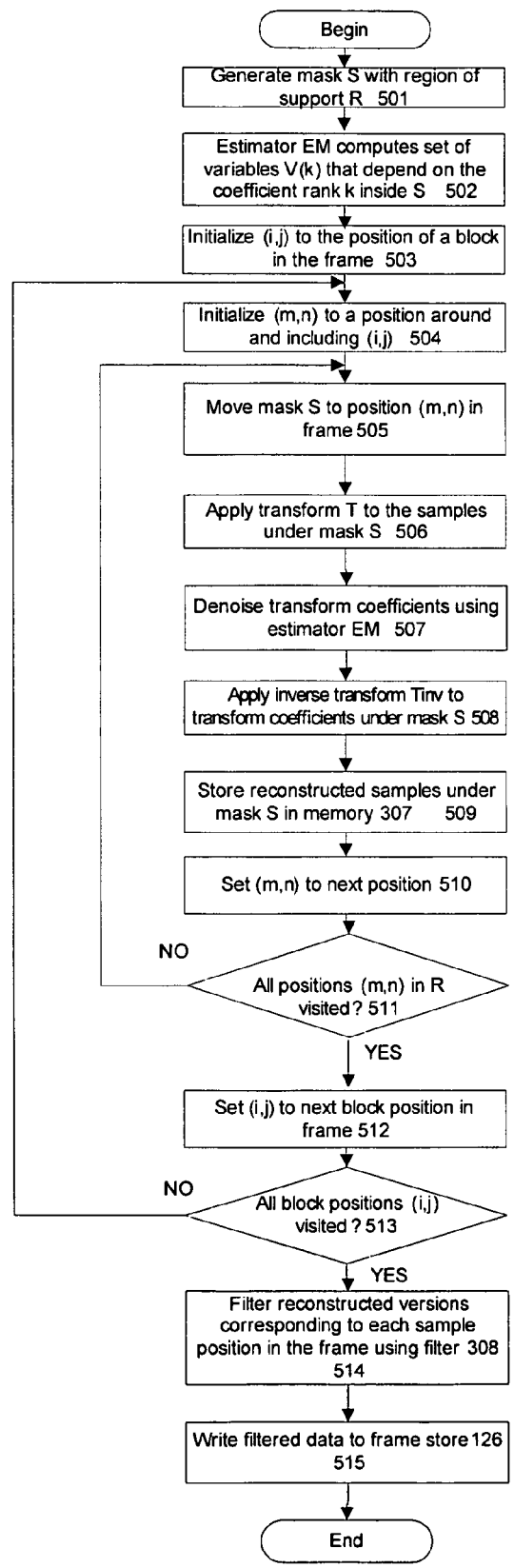
FIG. 5 is a flow diagram of another embodiment of a noise filtering process.

FIG. 5 is a flow diagram of an alternative embodiment of a noise filtering process performed by the noise filtering module. The process is performed by processing logic that may comprise hardware (circuitry, dedicated logic, etc.), software (such as is run on a general purpose computer system or a dedicated machine), or a combination of both. In one embodiment, the processing logic is part of estimator 304 of the noise filter module of FIG. 3.

Referring to FIG. 5, the process begins by processing logic generating a mask S with a region of support R (processing block 501). For example the mask size (region of support R) can be made equal to that of a block used in the encoding process.

Processing logic computes a set of variables V(k) (processing block 502). Since a transform (e.g., DCT) is applied to the samples under mask S (at processing block 303), the transform coefficients can be ranked as customary for such transforms. This rank is denoted by k. In this embodiment, the variables v(k) depend on the rank k of the transform coefficients generated under mask S. This set of auxiliary variables v(k) will be further used in the estimation process. Based on the quantization regime used by the codec, processing logic computes a measure of the quantization noise introduced by the coding process. For purposes herein, the quantization step used in the encoding process is denoted by q. In this case, processing logic computes a variable $$v^2(k) = \alpha(k)\frac{q^2}{4}.$$

where, α can be adapted based on various factors such as the rank k of the coefficient s(k) inside the mask S, in which α=α(k) case. For example, α is increased for higher rank coefficients. If v is a function of k, then b also becomes a function of coefficient rank k, $b(k)=\beta v^2(k)$. In another embodiment, processing logic computes additional auxiliary variables depending on the rank k of transform coefficients under to mask S (position within S), as follows:

$$t_1(k) = \mu v^2(k) - (\mu - 1)b(k)$$
$$x_1(k) = \sqrt{b(k)}$$
$$x_2(k) = \sqrt{t_1(k)}$$
$$z_1(k) = \frac{1}{x_2(k) - x_1(k)}$$
$$z_2(k) = x_1(k)z_1(k),$$

where μ is a selectable constant.

Alternatively, in another embodiment, processing logic computes the following auxiliary variables:

$$t_1(k) = \mu v^2(k) - (\mu - 1)b(k)$$
$$x_1(k) = \sqrt{b(k)}$$
$$x_2(k) = \sqrt{t_1(k)}$$
$$y_2(k) = \frac{\mu}{\mu + 1}x_2(k),$$
$$h_1(k) = \frac{y_2(k)}{x_2(k) - x_1(k)},$$
$$h_2(k) = \frac{y_2(k)x_1(k)}{x_2(k) - x_1(k)},$$

where μ is a selectable constant.

Processing logic then initializes (i,j) to the position of a block in the frame (processing block 503). In one embodiment, a block position (i,j) situated on the grid of blocks customarily used by a video codec to code/decode a frame is selected in the frame currently being filtered from memory (e.g., memory 123).

Processing logic also initializes (m,n) to a position around and including (i,j) (processing block 504). The position (m,n) is the position where the mask S is shifted compared to (i,j). Processing logic moves the mask S to position (m,n) in the frame (processing block 505).

Processing logic applies the transform T (e.g., DCT) to the samples under mask S (processing block 506) and denoises the transform coefficients (processing block 507). The N transform coefficients corresponding to the data samples covered by the current position of the mask S are denoted herein by s(k), k=1 ... N. The resulting transform coefficients are processed by processing logic in the estimator module. Different embodiments for this operation are illustrated in the flow diagrams of FIGS. 7 and 8, which are described in greater detail below.

In the flow diagram of FIG. 7, processing logic in the estimator module retrieves a transform coefficient s(k) and estimates the signal power by computing the value $s^2(k)$. Processing logic then compares the signal power with a threshold and determines the estimator value for a coefficient s(k) as follows:

if $s^2(k) <= b(k)$
$a(k) = 0;$
else
$$a(k) = \frac{s^2(k) - b(k)}{s^2(k) + v^2(k) - 2b(k)}.$$

Processing logic in the estimator then determines the processed transform coefficient p(k) according to:

$p(k)=a(k)s(k)$

In an alternate embodiment, using the process depicted in the flow diagram of FIG. 8, processing logic in the estimator makes use of the auxiliary variables and computes the value of the estimator for each coefficient s(k) as follows:

```
if s²(k)<=b(k)
    a(k) = 0;
else if b(k)< s²(k)<= t₁(k)
    a(k) = z₁ (k)s(k) - z₂ (k)
else
    a(k) = 1.
```

Processing logic in the estimator then determines the processed transform coefficient p(k) as:

$p(k)=a(k)s(k).$

In an alternate embodiment, also using the process depicted in the flow diagram of FIG. 8, for each coefficient s(k), processing logic in the estimator computes the value of processed coefficient p(k) as follows:

```
if s²(k) <=b(k)
    p(k) = 0;
else if b(k)< s²(k)<= t₁(k)
    p(k) = h₁ (k)s(k) - h₂ (k) ;
else
    p(k) = s(k).
```

FIG. 8 will be described in more detail below.

Processing logic stores the coefficient p(k) (e.g., in memory 305), irrespective of the whether the process of FIG. 7 or 8 are used. If not all coefficients have been processed the process described above is repeated.

After denoising, processing logic applies an inverse transform $T^{-1}$ (e.g., an inverse DCT) to the transform coefficients under mask S (processing block 508), resulting in samples r(k) corresponding to the current position (m,n) of the mask S in the frame, and stores the reconstructed samples under mask S in memory (e.g., memory 307) (processing block 509).

Processing logic then sets (m,n) to the next position (processing block 510) and tests whether all positions (m,n) in the region of support R have been visited (processing block 511). If not all the positions of the mask S around block position (i,j) have been processed, processing transitions to processing block 505, the next position (m,n) of mask S relative to (i,j) is selected and the process described above is repeated.

If all the positions of the mask S around block position (i,j) have been processed, processing block transitions to processing block 512, where processing logic selects the next block position (i,j) on the block grid in the frame tests whether all block positions (i,j) of the block being processed in the frame have been processed (processing block 513). If not, processing logic transitions to processing block 504 where the process continues from there. If so, processing transitions to processing block 514. In this way, the process above is repeated until all block positions (i,j) have been visited.

At processing block 514, processing logic filters the reconstructed versions corresponding to each sample position in the frame using a filter (processing block 514). In one embodiment, the filter used is filter 308. Thus, for each position (x,y) in the current frame being processed by the noise filter module 125, there are multiple processed and reconstructed samples $r^l(x,y)$ stored in memory 307 by the estimator, where l=1 ... L indexes the positions that the mask S can occupy around a block grid position in the frame, and where at each such location its region of support R contains sample position (x,y). In one embodiment, the filter 308 performs a weighted average operation on its input data $r^l(x,y)$ corresponding to a frame position (x,y):

$$f(x, y) = \sum_l w_l r^l(x, y),$$

where $w_l$ are weights selected based on statistics generated by the estimator. In one embodiments, the weights are all be selected to be equal, $$w_l = \frac{1}{L}.$$

In an alternative embodiment, the weights are selected to be proportional to the number of zero-valued processed coefficients p(k) resulting after the application of the estimator at a position l of the mask S.

Processing logic writes resulting filtered data samples f(x, y) for the current frame being processed to the frame store (e.g., frame store 126) (processing block 515).

Thereafter, the process ends.

Figure 6:
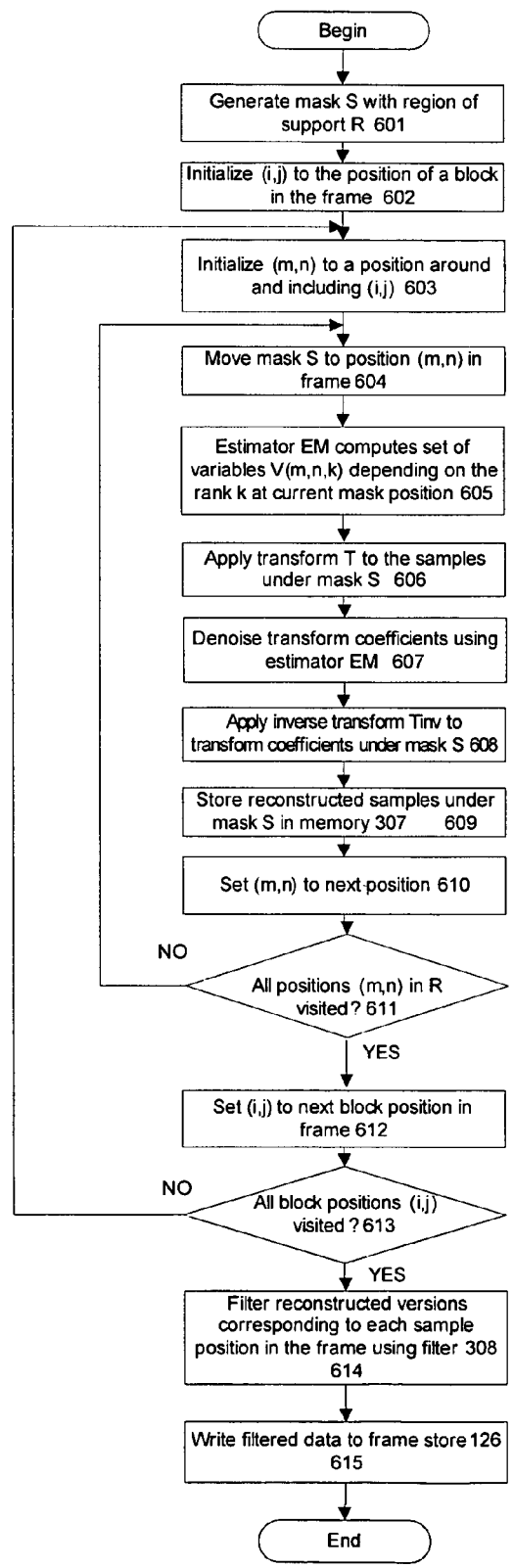
FIG. 6 is a flow diagram of yet another embodiment of a noise filtering process.

FIG. 6 is a flow diagram of yet another alternative embodiment of a noise filtering process performed by the noise filtering module. The process is performed by processing logic that may comprise hardware (circuitry, dedicated logic, etc.), software (such as is run on a general purpose computer system or a dedicated machine), or a combination of both.

Referring to FIG. 6, the process begins by processing logic generating mask S with a region of support R (processing block 601). In one embodiment, the mask size (region of support R) can be made equal to that of a block used in the encoding process.

Processing logic then initializes (i,j) to the position of a block in the frame (processing block 602). In one embodiment, a block position (i,j) situated on the grid of blocks customarily used by a video codec to code/decode a frame is selected in the frame currently being filtered from memory (e.g., memory 123).

Processing logic also initializes (m,n) to a position around and including (i,j) (processing block 603). The position (m,n) is the position where the mask S is shifted compared to (i,j). Processing logic moves the mask S to position (m,n) in the frame (processing block 604).

Processing logic in the estimator computes a set of variables V(m,n,k) that depend not only on the rank k of the transform coefficients generated by 303 at the current mask position (processing block 605) but also on the position (m,n) of the mask S in the frame. The set of auxiliary variables that will be further used in the estimation process. Based on the quantization regime used by the codec, processing logic computes a measure of the quantization noise introduced by the coding process. For purposes herein, the quantization step used in the encoding process is denoted by q. In this case, processing logic computes a variable $$v^2(m, n, k) = \alpha(m, n, k)\frac{q^2}{4}.$$

where α can be adapted based on various factors such as the rank k of the coefficient s(k) inside the mask S, and the position (m,n) of mask S around (i,j) in which case α=α(m, n,k). For example, α is increased for higher rank coefficients. If v is a function of (m,n,k) then b also becomes a function of coefficient rank m,n,k, b(m,n,k)=βv²(m,n,k). In another embodiment, processing logic computes additional auxiliary variables depending on the rank m,n,k of transform coefficients mapped to mask S (position within S), as follows:

$$t_1(m, n, k) = \mu v^2(m, n, k) - (\mu - 1)b(m, n, k)$$

$$x_1(m, n, k) = \sqrt{b(m, n, k)}$$

$$x_2(m, n, k) = \sqrt{t_1(m, n, k)}$$

$$z_1(m, n, k) = \frac{1}{x_2(m, n, k) - x_1(m, n, k)}$$

$$z_2(m, n, k) = x_1(m, n, k)z_1(m, n, k),$$

where μ is a selectable constant.

Alternatively, in another embodiment, processing logic computes the following auxiliary variables:

$$t_1(m, n, k) = \mu v^2(m, n, k) - (\mu - 1)b(m, n, k)$$

$$x_1(m, n, k) = \sqrt{b(m, n, k)}$$

$$x_2(m, n, k) = \sqrt{t_1(m, n, k)}$$

$$y_2(m, n, k) = \frac{\mu}{\mu + 1}x_2(m, n, k),$$

$$h_1(m, n, k) = \frac{y_2(m, n, k)}{x_2(m, n, k) - x_1(m, n, k)},$$

$$h_2(m, n, k) = \frac{y_2(m, n, k)x_1(m, n, k)}{x_2(m, n, k) - x_1(m, n, k)},$$

where μ is a selectable constant.

Processing logic applies the transform T (e.g., DCT) to samples under mask S (processing block 606) and denoises the transformed coefficients using processing logic in the estimator (processing block 607). The N transform coefficients corresponding to the data samples covered by the current position of the mask S are denoted herein by s(m,n,k), k=1 ... N. The resulting transform coefficients are processed by processing logic in the estimator module. Different embodiments for this operation are illustrated in the flow diagrams of FIGS. 7 and 8, which are described in greater detail below.

In the flow diagram of FIG. 7, processing logic in the estimator module retrieves a transform coefficient s(m,n,k) and estimates the signal power by computing the value s²(m, n,k). Processing logic then compares the signal power with a threshold and determines the estimator value for a coefficient s(m,n,k) as follows:

if $s^2(m, n, k) <= b(m, n, k)$ $a(m, n, k) = 0;$ else $$a(m, n, k) = \frac{s^2(m, n, k) - b(m, n, k)}{s^2(m, n, k) + v^2(m, n, k) - 2b(m, n, k)}.$$

Processing logic in the estimator then determines the processed transform coefficient p(m,n,k) according to:

p(m,n,k)=a(m,n,k)s(m,n,k).

In an alternate embodiment, using the process depicted in the flow diagram of FIG. 8, processing logic in the estimator makes use of the auxiliary variables and computes the value of the estimator for each coefficient s(m,n,k) as follows:

--- if s² ( m, n, k ) <=b(m, n, k)
    a(m,n,k) = 0;
else if b (m,n,k) <s² ( m, n, k ) <= t₁(m, n, k)
    a(m, n, k) = z₁(m, n, k)s(m, n, k) − z₂(m, n, k)
else
    a(m,n,k) = 1.

---

Processing logic in the estimator then determines the processed transform coefficient p(m,n,k) as:

p(m,n,k)=a(m,n,k)s(m,n,k).

In an alternate embodiment, also using the process depicted in the flow diagram of FIG. 8, for each coefficient s(m,n,k), processing logic in the estimator computes the value of processed coefficient p(m,n,k) as follows:

--- if s² ( m, n, k ) <=b(m, n, k)
    p(m, n, k) = 0;
else if b(m, n, k) <s² ( m, n, k ) <= t₁(m, n, k)
    p(m, n, k) = h₁ (m, n, k)s(m, n, k) − h₂ (m, n, k) ;
else
    p(m,n,k) = s(m,n,k).

---

FIG. 8 will be described in more detail below.

Processing logic stores the coefficient p(k), irrespective of the whether the process of FIG. 7 or 8 are used, is stored in memory (e.g., memory 305). If not all coefficients have been processed the process described above is repeated.

Next, processing logic applies the inverse transform $T^{-1}$ to the transform coefficients under mask S (processing block 608), resulting in samples r(m,n,k) corresponding to the current position (m,n) of the mask S in the frame. Processing logic stores these reconstruction samples under mask S in memory (e.g., memory 307) (processing block 609).

Processing logic then sets (m,n) to the next position (processing block 610) and tests whether all positions (m,n) in the region of support R have been visited (processing block 611). If not all the positions of the mask S around block position (i,j) have been processed, processing transitions to processing block 605, the next shift position (m,n) of mask S relative to (i,j) is selected and the process described above is repeated.

If all the positions of the mask S around block position (i,j) have been processed, processing block transitions to processing block 612, where processing logic selects the next block position (i,j) on the block grid in the frame tests whether all block positions (i,j) of the block being processed in the frame have been processed (processing block 613). If not, processing logic transitions to processing block 604 where the process continues from there. If so, processing transitions to processing block 614. In this way, the process above is repeated until all block positions (i,j) have been visited.

At processing block 614, processing logic filters the reconstruction versions corresponding to each sample position in the frame using a filter (e.g., filter 308) (processing block 614) and writes the resulting filtered data samples f(x,y) for the current frame being processed into the frame store (e.g., frame store 126) (processing block 615). In one embodiment, processing logic filters the estimated samples stored in memory (e.g., memory 307) corresponding to each sample in the current frame. In one embodiment, this filtering is performed by filter 308 of the noise filter module 125. Thus, for each position (x,y) in the current frame being processed by the noise filter module 125, there are multiple processed and reconstructed samples $r^l(x,y)$ stored in memory by the estimator 304, where l=1 ... L indexes the positions that the mask S can occupy around a block grid position in the frame, and where at each such location its region of support R contains sample position (x,y). In one embodiment, the filter performs a weighted average operation on its input data $r^l(x,y)$ corresponding to a frame position (x,y):

$$f(x, y) = \sum_l w_l r^l(x, y),$$

where $w_l$ are weights selected based on statistics generated by processing logic in the estimator. In one embodiment, the weights are all be selected to be equal, $$w_1 = \frac{1}{L}.$$

In an alternative embodiment, the weights are selected to be proportional to the number of zero-valued processed coefficients p(k,) resulting after the application of the estimator at a position l of the mask S.

Then the process ends.

Examples of Estimation Processes

FIG. 7 is a flow diagram of one embodiment of an estimation process. The process is performed by processing logic that may comprise hardware (circuitry, dedicated logic, etc.), software (such as is run on a general purpose computer system or a dedicated machine), or a combination of both.

Referring to FIG. 7, the process begins by processing logic retrieving a transform coefficient (processing block 701) and estimating the signal power of the transform coefficient (processing block 702). In one embodiment, the signal power is estimated by taking the square of the transform coefficient.

The processing logic then tests whether the signal power is less than a threshold (processing block 703). One embodiment of the threshold has been described above. If it is, processing logic sets the coefficient to 0 (processing block 704) and processing transitions to processing block 706 where the coefficient is stored. If not, processing logic adjusts the value of the coefficient based on signal power, noise power and threshold by executing the logic described above (processing block 705) and processing transitions to processing block 706 where the coefficient is stored.

After storing the coefficient, processing logic tests whether all coefficients have been processed (processing block 707). If not, processing logic transitions to processing block 701 and the process continues from that point. If so, the process ends.

FIG. 8 is a flow diagram of an alternative embodiment of an estimation process. The process is performed by processing logic that may comprise hardware (circuitry, dedicated logic, etc.), software (such as is run on a general purpose computer system or a dedicated machine), or a combination of both.

Referring to FIG. 8, the process begins by processing logic retrieving a transform coefficient (processing block 801) and estimating the signal power of the transform coefficient (processing block 802). In one embodiment, the signal power is estimated by taking the square of the transform coefficients. The processing logic then tests whether the signal power is less than a threshold (processing block 803). One embodiment of the threshold is described above. If it is, processing logic sets the coefficient to 0 (processing block 804) and processing transitions to processing block 806 where the coefficient is stored. If not, processing logic tests whether the signal power is less than a second threshold (processing block 805). The embodiment of the threshold is described above. If it is, processing logic adjusts the value of the coefficient based on the signal power, noise power and threshold by executing the logic described above (processing block 806) and processing transitions to processing block 808 where the coefficient is stored. If not, processing logic leaves the coefficient unchanged (processing block 807) and transitions to processing block 808 where the coefficient is stored.

After storing the coefficient, processing logic tests whether all coefficients have been processed (processing block 809). If not, processing logic transitions to processing block 701 and the process continues from that point. If so, the process ends.

An Example of a Video Decoder

Figure 9:
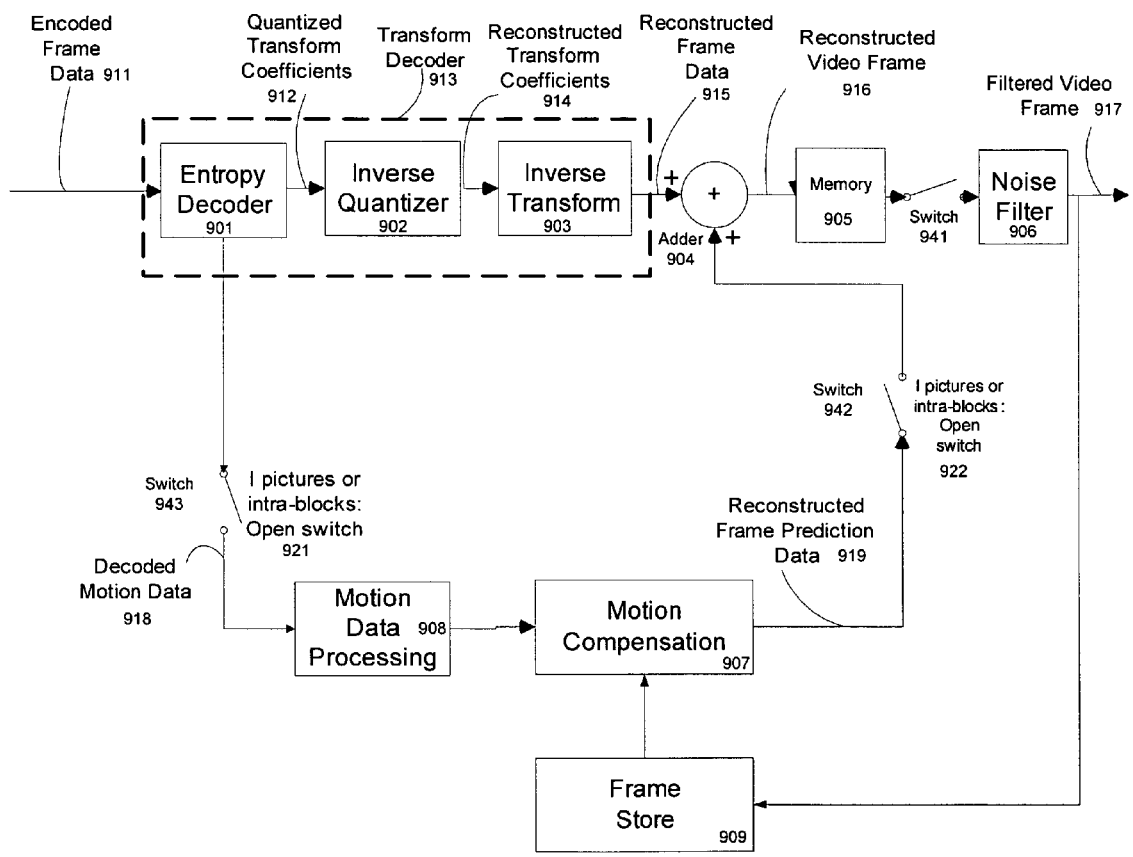
FIG. 9 is a block diagram of one embodiment of a video decoder.

FIG. 9 is a block diagram of one embodiment of a video decoder (VD). Referring to FIG. 9, the video decoder comprises a transform decoder 913, adder 904, a memory module 905, a motion compensation and prediction module (MCPM) 907, a motion data processing module (MDPM) 908, a frame store 909, a noise filter module (NFM) 906, and switches 941-943. In one embodiment, transform decoder 913 includes an entropy decoder 901, an inverse quantizer 902, and an inverse transform module 903.

The video decoder reconstructs the video frame data according to the process specified below in conjunction with the flow diagram of FIG. 10. Switches 942 and 943 are open or closed depending on the decoded block type (intra-coded or predicted) similar to the operation of conventional coding processes. Switch 941 is initially open.

Figure 10:
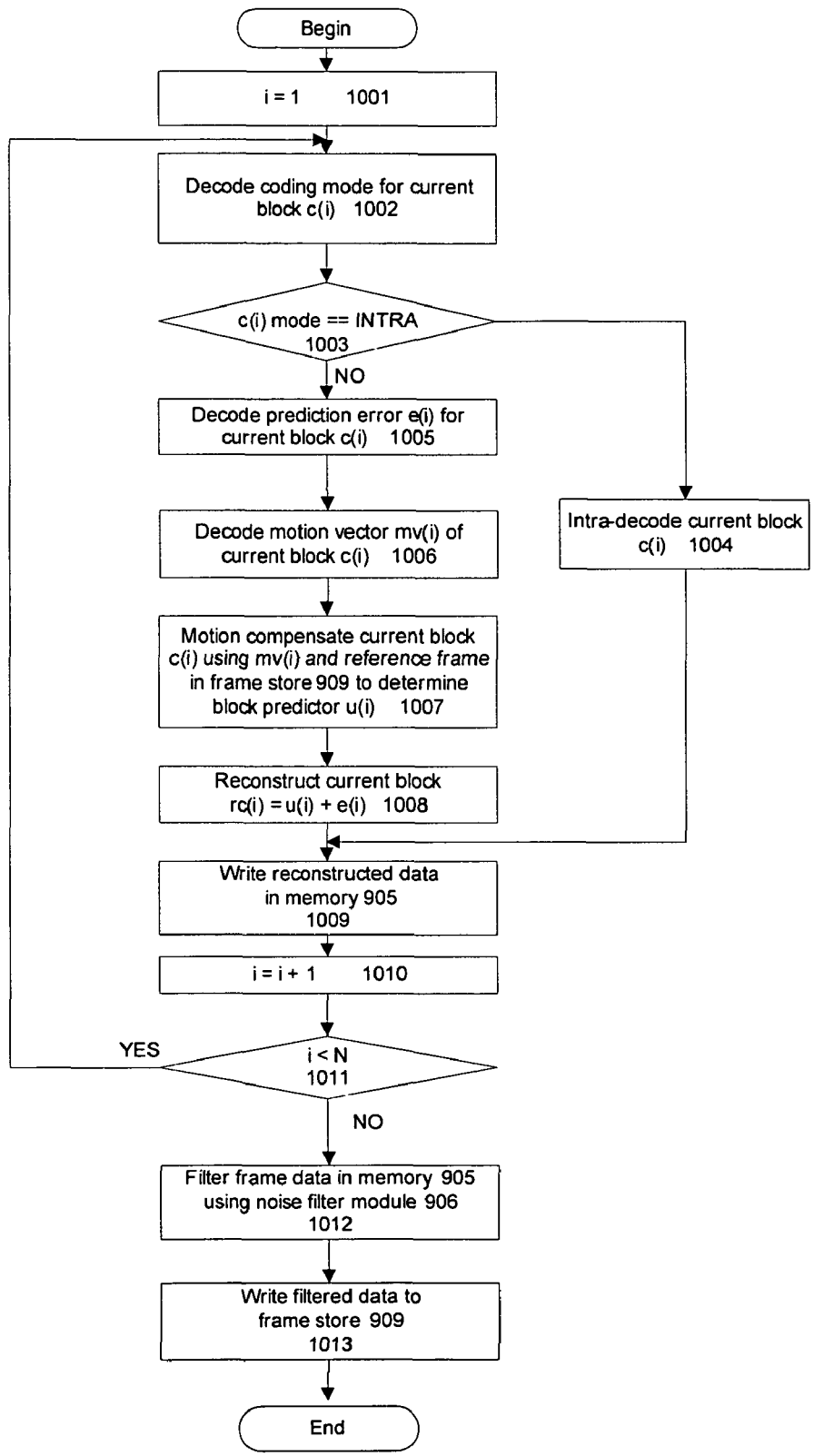
FIG. 10 is a flow diagram of one embodiment of a video decoding process.

FIG. 10 is a flow diagram of one embodiment of video decoding process. The process is performed by processing logic that may comprise hardware (circuitry, dedicated logic, etc.), software (such as is run on a general purpose computer system or a dedicated machine), or a combination of both.

Referring to FIG. 10, the process begins by processing logic initializing an index variable i equal to 1 (processing block 1001).

Processing logic then decodes the coding mode for the current block c(i) in the video frame being decoded (processing block 1002) and tests whether the coding mode of block c(i) is equal to INTRA (processing block 1003). If it is, processing logic intra-decodes the current block c(i) according to a conventional process (processing block 1004) and transitions to processing block 1009. If not, processing logic decodes the block prediction error e(i) for the current block c(i) using transform decoder 913 (processing block 1005), decodes motion vector mv(i) of the current block c(i) using the transform decoder 913 and MDPM 908 (processing block 1006), motion compensates the current block c(i) using mv(i) and the reference frame in the frame store to determine a block predictor u(i) (processing block 1007). In one embodiment, the decoded motion vector mv(i) is used by MCPM 908 to fetch a reference block (predictor) u(i) from a reference frame stored in frame store 909.

Next, processing logic reconstructs the current block according to the following equation:

$$rc(i)=u(i)+e(i)$$

(processing block 1008). In other words, the current block rc(i) is reconstructed by adding the prediction error e(i) to the predictor samples u(i).

Thereafter, processing logic writes the reconstructed data in memory (e.g., memory 905) (processing block 1009). That is, the data corresponding to the reconstructed block rc(i) is written into memory. The processing logic then moves on to the next block position in the current frame being decoded by incrementing i by one (processing block 1010).

Processing logic tests whether the index variable i is less than N which is the total number of blocks in the current frame being processed (processing block 1011). If it is, processing logic transitions to processing block 1002 where the process is continues from that point. In this way, the process described above is repeated for all blocks in the current frame being decoded. If not, switch 941 is closed and processing logic filters the frame data in memory (e.g., memory 905) using a noise filter module (e.g., noise filter module 906) (processing logic 1012). In one embodiment, the decoded frame data stored in memory module 905 is read by the loop filtering module which executes the same process as the one described for the loop filter module 125 in the video encoder. Then processing logic writes the filtered data to the frame store (e.g., frame store 909) (processing block 1013).

Thereafter, the process ends.

Thus, the methods and apparatus described herein are used to determine a video frame data filtering that results in superior objective and subjective (image quality) performance compared to related art solutions.

An Example Computer System

Figure 11:
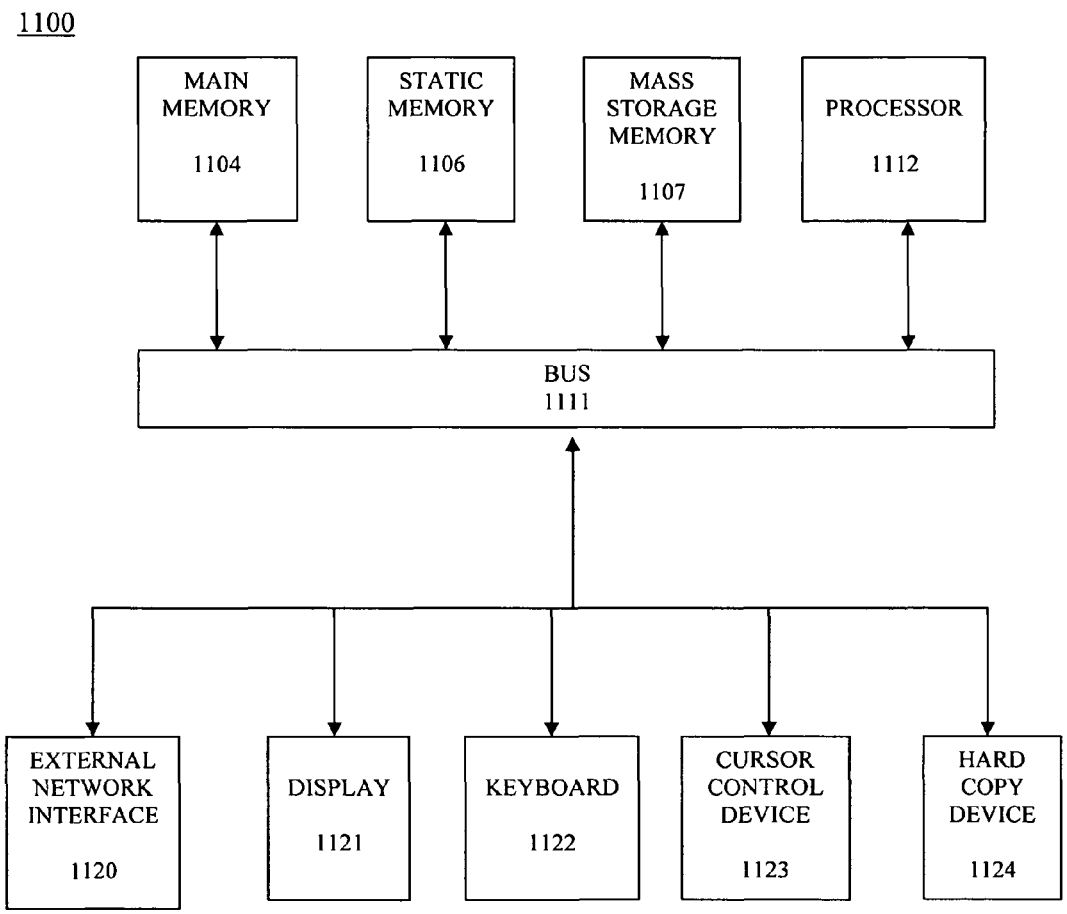
FIG. 11 is a block diagram of one embodiment of a computer system.

FIG. 11 is a block diagram of an exemplary computer system that may perform one or more of the operations described herein. Referring to FIG. 11, computer system 1100 may comprise an exemplary client or server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium™, PowerPC™, Alpha™, etc.

System 1100 further comprises a random access memory (RAM), or other dynamic storage device 1104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for marking information on a medium such as paper, film, or similar types of media. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A video coder for encoding the data in a video frame, the video coder comprising:
   a noise filtering module to operate on transformed frame data and perform signal estimation on a plurality of transform coefficients by
   estimating signal power for each of the plurality of transform coefficients,
   comparing the signal power of said each coefficient with at least one threshold, and
   setting the value of said each transform coefficient based, at least in part, on results of comparing the signal power to the at least one threshold, wherein setting the setting the value of said each transform coefficient based, at least in part, on results of comparing the signal power to the at least one threshold comprises, for said each transform coefficient,
   setting a coefficient to zero if the signal power of the coefficient is less than a first threshold,
   setting the coefficient to a value based on the signal power, noise power and the first threshold if the signal power of the coefficient is not less than a first threshold and is less than a second threshold, and
   leaving the coefficient unchanged if the signal power of the coefficient is not less than a first threshold and is not less than a second threshold.

2. The video coder defined in claim 1 wherein the at least one threshold comprises a pair of thresholds.

3. The video coder defined in claim 1 wherein the noise module filter comprises:
   a transform module to generate the plurality of transform coefficients in response to decoded frame data;
   an estimator, responsive to transformed coefficients generated by the transform module, to generate denoised transform coefficients;
   an inverse transform module to generate denoised samples from denoised transform coefficients output from the estimator; and a filter to filter denoised samples generated by the inverse transform module to create reconstructed frame samples.

4. The video coder defined in claim 3 wherein the transform module, the inverse transform module and the filter operate based on a mask specifying positions in a frame being processed.

5. The video coder defined in claim 4 further comprising a mask position generator to generate the mask.

6. A method comprising:
estimating signal power for each of the plurality of transform coefficients;
comparing the signal power of said each coefficient with at least one threshold; and
setting the value of said each transform coefficient based, at least in part, on results of comparing the signal power to the at least one threshold, wherein setting the value of said each transform coefficient based, at least in part, on results of comparing the signal power to the at least one threshold comprises, for said each transform coefficient,
setting a coefficient to zero if the signal power of the coefficient is less than a first threshold,
setting the coefficient to a value based on the signal power, noise power and the first threshold if the signal power of the coefficient is not less than a first threshold and is less than a second threshold, and
leaving the coefficient unchanged if the signal power of the coefficient is not less than a first threshold and is not less than a second threshold.

7. The method defined in claim 6 wherein the at least one threshold comprises a pair of thresholds.

8. The method defined in claim 6 further comprising:
generating the plurality of transform coefficients in response to decoded frame data;
generating, in response to the transform coefficients, denoised transform coefficients;
generating denoised samples from denoised transform coefficients output from an estimator; and
filtering denoised samples generated by the inverse transform module to create reconstructed frame samples.

9. The method defined in claim 8 further comprising generating the plurality of transform coefficients in response to decoded frame data;
generating, in response to the transform coefficients, denoised transform coefficients;
generating denoised samples from denoised transform coefficients output from the estimator; and
filtering denoised samples generated by the inverse transform module to create reconstructed frame samples based on a mask specifying positions in a frame being processed.

10. An article of manufacture having one or more non-transitory computer readable medium storing instructions thereon which, when executed by a system, cause the system to perform a method comprising:
estimating signal power for each of the plurality of transform coefficients;
comparing the signal power of said each coefficient with at least one threshold; and
setting the value of said each transform coefficient based, at least in part, on results of comparing the signal power to the at least one threshold, wherein setting the setting the value of said each transform coefficient based, at least in part, on results of comparing the signal power to the at least one threshold comprises, for said each transform coefficient,
setting a coefficient to zero if the signal power of the coefficient is less than a first threshold,
setting the coefficient to a value based on the signal power, noise power and the first threshold if the signal power of the coefficient is not less than a first threshold and is less than a second threshold, and
leaving the coefficient unchanged if the signal power of the coefficient is not less than a first threshold and is not less than a second threshold.

11. A method for denoising video frame data comprising:
retrieving frame data from a memory;
applying a transform to samples in the frame under a mask to create transform coefficients;
denoising the transform coefficients, wherein denoising the transform coefficients comprises:
estimating signal power for each of the transform coefficients,
comparing the signal power to a first threshold,
setting said each transform coefficient to a first value if the signal power is less than the first threshold,
comparing the signal power to a second threshold,
adjusting said each transform coefficient value based on the signal power, noise power, and first and second threshold values if the signal power is less than the second threshold and not less than the first threshold, and
leaving said each transform coefficient value unchanged if the signal power is not less than the second threshold and not less than the first threshold;
applying an inverse transform to the denoised transform coefficients; and
filtering the denoised frame samples corresponding to a position in a frame to obtain the filtered data sample at that position.

12. The method defined in claim 11 wherein the first value is zero.

13. An article of manufacture having one or more non-transitory computer readable medium storing instructions thereon which, when executed by a system, cause the system to perform a method for denoising video frame data comprising:
retrieving frame data from a memory;
applying a transform to samples in the frame to create transform coefficients;
denoising the transform coefficients, wherein denoising the transform coefficients comprises:
estimating signal power for each of the transform coefficients,
comparing the signal power to a first threshold,
setting said each transform coefficient to a first value if the signal power is less than the first threshold,
comparing the signal power to a second threshold,
adjusting said each transform coefficient value based on the signal power, noise power, and first and second threshold values if the signal power is less than the second threshold and not less than the first threshold, and
leaving said each transform coefficient value unchanged if the signal power is not less than the second threshold and not less than the first threshold;
applying an inverse transform to the denoised transform coefficients; and
filtering the denoised frame samples corresponding to a position in a frame to obtain the filtered data sample at that position.

14. An estimator module comprising:
    means for estimating signal power;
    means for comparing the estimated signal power to one or more thresholds; and
    means for adjusting signal transform coefficient values according to the results of comparing the signal transform coefficient values with one or more thresholds and based on the values of the estimated signal power, noise power and the one or more thresholds, including setting the setting the value of each transform coefficient based, at least in part, on results of comparing the estimated signal power to the one or more thresholds, wherein setting the setting the value of each transform coefficient comprises, for said each transform coefficient,
        setting a coefficient to zero if the signal power of the coefficient is less than a first threshold,
        setting the coefficient to a value based on the signal power, noise power and the first threshold if the signal power of the coefficient is not less than a first threshold and is less than a second threshold, and
        leaving the coefficient unchanged if the signal power of the coefficient is not less than a first threshold and is not less than a second threshold.

15. A video decoder for decoding the data in a video frame, the video decoder comprising:
    a noise filtering module to operate on transformed frame data and perform signal estimation on a plurality of transform coefficients by
        estimating signal power for each of the plurality of transform coefficients,
        comparing the signal power of said each coefficient with at least one threshold, and
        setting the value of said each transform coefficient based, at least in part, on results of comparing the signal power to the at least one threshold, wherein setting the setting the value of said each transform coefficient based, at least in part, on results of comparing the signal power to the at least one threshold comprises, for said each transform coefficient,
            setting a coefficient to zero if the signal power of the coefficient is less than a first threshold,
            setting the coefficient to a value based on the signal power, noise power and the first threshold if the signal power of the coefficient is not less than a first threshold and is less than a second threshold, and
            leaving the coefficient unchanged if the signal power of the coefficient is not less than a first threshold and is not less than a second threshold.

16. The video decoder defined in claim 15 wherein the at least one threshold comprises a pair of thresholds.

17. The video decoder defined in claim 15 wherein the noise filter comprises:
    a transform module to generate the plurality of transform coefficients in response to decoded frame data;
    an estimator, responsive to transform coefficients generated by the transform module, to generate denoised transform coefficients;
    an inverse transform module to generate denoised samples from denoised transform coefficients output from the estimator; and
    a filter to filter denoised samples generated by the inverse transform module to create reconstructed frame samples.

18. The video decoder defined in claim 17 wherein the transform module, the inverse transform module and the filter operate based on a mask specifying positions in a frame being processed.

19. The video decoder defined in claim 18 further comprising a mask position generator to generate the mask.

20. A decoding method comprising:
    decoding a prediction error for a block of frame data;
    decoding a motion vector associated with the block;
    performing motion compensation on the block using the motion vector and a reference frame to determine a block predictor;
    reconstructing the block using the block predictor and the prediction error; and
    filtering reconstructed block samples by generating a plurality of transform coefficients from the frame data, comparing an estimate of signal power of the transform coefficients to one or more thresholds to generate denoised transform coefficients in response to the transform coefficients, and filtering denoised samples to create reconstructed frame samples, including
        comparing the estimate of the signal power to a first threshold,
        setting said each transform coefficient to a first value if the estimate of signal power is less than the first threshold,
        comparing the estimate of signal power to a second threshold,
        adjusting said each transform coefficient value based on the estimate of the signal power, noise power, and first and second threshold values if the signal power is less than the second threshold and not less than the first threshold, and
    leaving said each transform coefficient value unchanged if the signal power is not less than the second threshold and not less than the first threshold.

21. The decoding method defined in claim 20 wherein the at least one threshold comprises a pair of thresholds.

22. The decoding method defined in claim 20 further comprising setting the value of each transform coefficient based, at least in part, on results of comparing the signal power to the one or more thresholds.

23. An article of manufacture having one or more non-transitory computer readable medium storing instructions thereon which, when executed by a system, cause the system to perform a decoding method comprising:
    decoding a prediction error for a block of frame data;
    decoding a motion vector associated with the block;
    performing motion compensation on the block using the motion vector and a reference frame to determine a block predictor;
    reconstructing the block using the block predictor and the prediction error; and
    filtering reconstructed block samples by generating a plurality of transform coefficients from the frame data, comparing an estimate of signal power of the transform coefficients to one or more thresholds to generate denoised transform coefficients in response to the transform coefficients, and filtering denoised samples to create reconstructed frame samples, including
        comparing the estimate of the signal power to a first threshold, setting said each transform coefficient to a first value if the estimate of the signal power is less than the first threshold, comparing the estimate of the signal power to a second threshold, adjusting said each transform coefficient value based on the estimate of the signal power, noise power, and first and second threshold values if the signal power is less than the second threshold and not less than the first threshold, and leaving said each transform coefficient value unchanged if the signal power is not less than the second threshold and not less than the first threshold.

\* \* \* \* \*